United States Patent [19]

DiFoggio

[11] 4,439,497

[45] Mar. 27, 1984

[54] ULTRASONIC SOUND ABSORBER

[75] Inventor: Rocco DiFoggio, Houston, Tex.

[73] Assignee: Shell Oil Company, Houston, Tex.

[21] Appl. No.: 382,535

[22] Filed: May 27, 1982

[51] Int. Cl.[3] .......................... F16F 7/00; F16F 13/00

[52] U.S. Cl. ................................ 428/539.5; 428/556; 419/23; 181/207; 181/208; 181/209; 252/12.2; 367/157; 367/155; 367/162

[58] Field of Search ............... 428/539.5, 566; 419/23; 181/207, 208, 209; 252/12.2; 367/157, 155, 162, 911, 912

[56] References Cited

U.S. PATENT DOCUMENTS

| | | | |
|---|---|---|---|
| 1,753,581 | 4/1930 | Seabury | 252/12.2 |
| 2,133,761 | 10/1938 | Tietig | 428/566 |
| 3,172,502 | 3/1965 | Wells | 181/207 |
| 4,083,595 | 4/1978 | Maier | 296/39 A |
| 4,147,821 | 4/1979 | Young | 428/539.5 |
| 4,283,465 | 8/1981 | Morimoto et al. | 428/566 |

FOREIGN PATENT DOCUMENTS

| | | | |
|---|---|---|---|
| 54-11691 | 5/1979 | Japan | 428/539.5 |

OTHER PUBLICATIONS

Freeman, *Silicones*, 1962, pp. 26-27.

Herzfeld and Litovitz, *Absorption and Dispersion of Ultrasonic Waves*, 1959, pp. 34-48.

Kinsler and Frey, *Fundamentals of Acoustics*, 1951, pp. 231-243.

Meyer and Neumann, *Physical and Applied Acoustics*, 1972, pp. 13-17.

*Primary Examiner*—Brooks H. Hunt

[57] ABSTRACT

An ultrasonic sound absorbing material capable of operating at high temperatures and pressures, said material comprises a dense, rigid, permeable material such as sintered metal filled with a viscous fluid.

5 Claims, 2 Drawing Figures

ULTRASONIC SOUND ABSORBER

BACKGROUND OF THE INVENTION

The present invention relates to acoustical devices and particularly to an ultrasonic sound absorbing material or baffle. The sound absorbing baffle is particularly useful in acoustical logging instruments used for measuring characteristics of formations that are penetrated by boreholes drilled in the earth. Acoustical logs that represent acoustical properties of formations are extensively used in evaluating formations. In addition to general acoustical properties of formations, acoustical logging methods have also been used to detect vertical fractures in formations. Fractured formations are difficult to locate and yet they provide a valuable source of hydrocarbons.

An acoustical tool that is designed to locate vertical fractures is described in U.S. Pat. No. 4,130,816. This patent describes the use of four cylindrical transducers disposed in a horizontal plane and positioned in close proximity to the borehole wall. Two of the transducers are used as transmitters while two are used as receivers to measure the circumferential acoustic characteristics of the formations. The tool is designed to detect both the compressional and the shear waves that travel horizontally or circumferentially around the borehole wall. Shear waves lose much of their amplitude when they traverse an open space, such as a fracture, and by observing those locations where the amplitude of the shear wave is materially decreased, one can locate or detect the presence of fractured formations.

One problem with the above described logging tool has been the interference caused by waves which travel directly from the transmitter through the borehole fluid to the receiver. These waves are often of larger amplitude than the compressional and shear waves which have travelled circumferentially around the borehole through the formation. These waves are often referred to as fluid waves and they arrive at the receiver at approximately the same time that the shear waves which travel through the formation. In an attempt to limit or decrease the effect of fluid waves on the receiving transducer, various acoustical absorbing materials have been placed around the cylindrical transducers. The absorbers are designed to block sound energy that tends to travel through the fluid and arrive at the receiver from a direction opposite the borehole wall. These absorbers include various types of moldable plastic materials which are filled with lead or similar heavy metals. While the absorbers have improved the response of the tool they have not entirely eliminated the interference from fluid waves since they do not completely absorb the fluid waves.

SUMMARY OF THE INVENTION

The present invention solves the above problems by providing a unique material which is capable of absorbing considerably more of the ultrasonic energy than previously used materials. For example, a lead-epoxy material absorbs approximately two decibels per inch while the material of this invention absorbs 190 decibels per inch. The material comprises a sintered powdered metal which is filled with a viscous fluid. The powdered metal can comprise various iron powders or stainless steel powders although sintered bronze materials are preferred since they are both non-magnetic and non-corrosive. For general purpose sound absorption the sintered bronze can be filled with water although a fluid which has better wetting characteristics with respect to the bronze improves the results. Likewise, in some applications water is not a desirable filling material since it can be displaced by the fluid in which the sound absorber is immersed. In these applications a more viscous fluid such as a silicone fluid or oil insoluble fluorosilicone fluids can be used.

The sound absorber material can be easily formed in various shapes so that it can be positioned around transducers or other devices to absorb the ultrasonic energy. The material could also be provided in a bulk form which then could be machined or otherwise shaped to a particular configuration. However, any face of the material intended to be sound absorbing should be used as originally molded. It should not be machined since machining can reduce the facial permeability and hence the sound absorption.

BRIEF DESCRIPTION OF THE DRAWINGS

The present invention will be more easily understood from the following detailed description of a preferred embodiment when taken in conjunction with the attached drawings in which.

DESCRIPTION OF A PREFERRED EMBODIMENT

Figure 1:
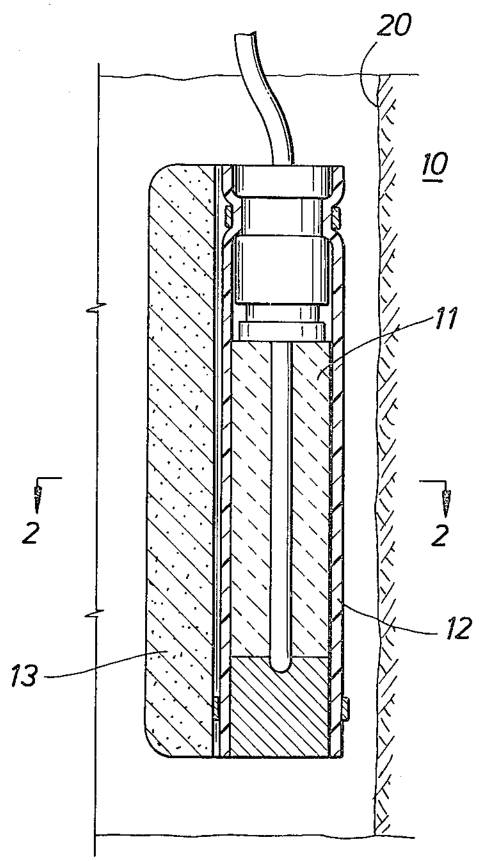
FIG. 1 is an elevation view in section of the material of this invention used as an absorber in an acoustic logging tool.

As explained above, the material of this invention provides an ultrasonic sound absorbing baffle that is capable of operating both at high pressures and high temperatures such as those encountered in a borehole. While the invention is particularly described in relation to its use as a sound absorbing medium in a borehole, it of course can be used in any application where it is necessary or desirable to absorb acoustic energy. As a result of its ability to withstand high pressures and high temperatures, it can be used in both hostile and non-hostile environments.

The material comprises a rigid, permeable material that is filled with a viscous fluid. In particular, the material is porous sintered metal and preferably, sintered porous bronze. The choice of metal used will depend upon the environment in which it is to be used as well. For example, sintered porous stainless steel could be used but would present a problem if lost in a borehole because of its hardness. The viscous fluid used for filling the porous bronze could be water although silicone fluids are preferred. It is believed that the sound causes the fluid to flow back and forth through the permeable structure of the material resulting in viscous energy losses and thus absorbing the sound. Thus, the fluid must remain in the material and not be displaced by foreign fluids or materials that would clog the pore spaces of the material. In any acoustic energy three types of waves are present; shear waves, fast compressional waves and slow compressional waves. In general terms, the shear and fast compressional waves are carried by the matrix material as modified by the filling material while the slow compressional waves are carried by the fluid as modified by the matrix. In the case of a sintered material disposed in a fluid such as water, very few shear waves are produced by a plane wave incident on its surface. The acoustic impedance of a dense sintered material such as sintered bronze is much greater than water and the incident sound is largely reflected by the bronze matrix and largely transmitted by the water-filled pores. Thus, the slow compressional waves are largely absorbed by viscous energy losses caused by the mismatch between the acoustic impedance of the matrix and filling material. In contrast, sintered glass frits having the same permeabilities as sintered bronze but a much lower acoustic impedance do not work nearly as well.

The sintered bronze powder is a desirable choice for the material because it has a much higher acoustic impedance than most fluids which results in a high relative velocity and therefore high sound absorption. Also, it is relatively easily molded into any desired shape and has relatively high tensile stress strength which allows it to withstand high pressures and physical impact. In particular, a 153-A grade sintered porous bronze has been found to have excellent absorption when filled with fluorosilicone fluid such as that manufactured by Dow Corning and given the designation FS-1265. A grade 153-A sintered bronze has a grain density of 8.886 gr/cm$^3$, a pore diameter of 36–60 microns, a porosity of 40.7% and a permeability of 3,230 millidaries. Another acceptable silicone fluid manufactured by Dow Corning is one referred to as DC-200, though this fluid is soluble in oil and thus cannot be used in an environment in which hydrocarbons are present, for example, boreholes filled with oil-based drilling fluids. The sound absorber fabricated from the fine grain 153-A sintered bronze and filled with Dow Corning fluid DC-200 was found to have excellent sound absorbing properties in the 120 KHz range. The sound absorbing ability remained high even at elevated temperatures and pressures in the range of 400° F. and 10,000 psi since the silicone oil retains its viscosity over a much wider range of temperatures than plain hydrocarbon oils.

Since sound absorbing material is a rigid porous structure of high tensile strength high pressures do not decrease its effectiveness. In contrast, most sound absorbing materials rely upon isolated air spaces formed in plastic materials as sound absorbing materials. Since the materials are readily deformable when they are subject to high pressures, the air spaces are compacted or eliminated and the material loses its sound absorbing properties.

Figure 2:
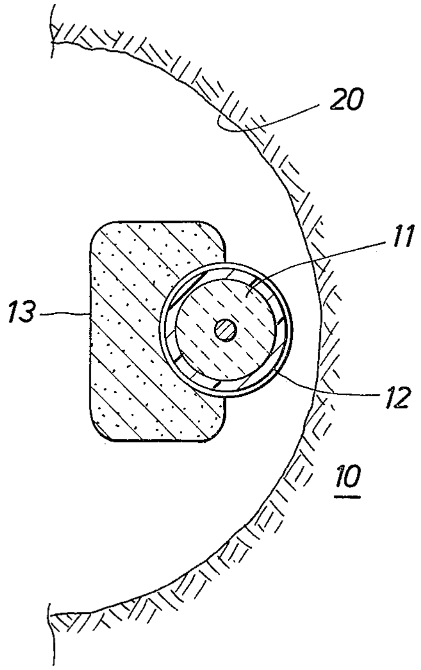
FIG. 2 is a horizontal section taken along line 2—2 of FIG. 1.

Referring to FIGS. 1 and 2, there is shown one application of the sound absorbing material described above with the transducers described in U.S. Pat. No. 4,130,816. In particular, the material is illustrated in use with a cylindrical piezoelectric transducer 11 which is mounted in a holder and provided with a protective plastic covering 12. The transducer is positioned adjacent the surface of a formation 10 which has been penetrated by a borehole 20. Sound absorbing material 13 is placed on the side of the transducer opposite the borehole wall in order to absorb all sound waves travelling through the fluid filling the borehole. As seen in FIG. 2, the sound absorber surrounds approximately 180 degrees of the circumference of the transducer and effectively isolates the transducer from the borehole fluid. This improves its response to acoustic waves that have travelled through the formation 10 and the ability of the logging tool to detect fractures.

From the above description it can be seen that the invention provides a very efficient sound absorbing material which can be easily formed or molded to conform to any desired shape. While the material has been described with particular application to an acoustic logging tool, it obviously can be used in any system in which it is desired to absorb ultrasonic energy. In this respect it can be substituted for presently used sound absorbing materials. As a result of its high efficiency in absorbing ultrasonic energy, the thickness of material required is considerably reduced and thus it compares favorably with the conventional materials such as plastics or rubber products.

I claim:

1. A compact ultrasonic sound adsorbing material for use with the transducer of an acoustical logging system comprising:

a sound adsorber, said adsorber being formed of sintered porous metal powder shaped to surround a portion of the transducer to adsorb acoustic waves arriving from predetermined directions, the surface of said adsorber facing said predetermined direction being retained in the as molded condition and free of any covering; and a viscous liquid, said liquid filling the pore space of the sound adsorber.

2. The sound absorbing material of claim 1 wherein the metal is bronze.

3. The sound absorbing material of claim 1 wherein the metal is a stainless steel.

4. The sound absorbing material of claim 1 wherein the viscous liquid is a silicone oil.

5. The sound absorbing material of claim 4 wherein said silicone oil is non-soluble in hydrocarbons.

* * * * *